Oct. 31, 1933.  A. G. FORSYTH  1,933,424
TWO-SPEED GEAR FOR INTERNAL COMBUSTION ENGINE SUPERCHARGERS
Filed April 13, 1933   2 Sheets-Sheet 1
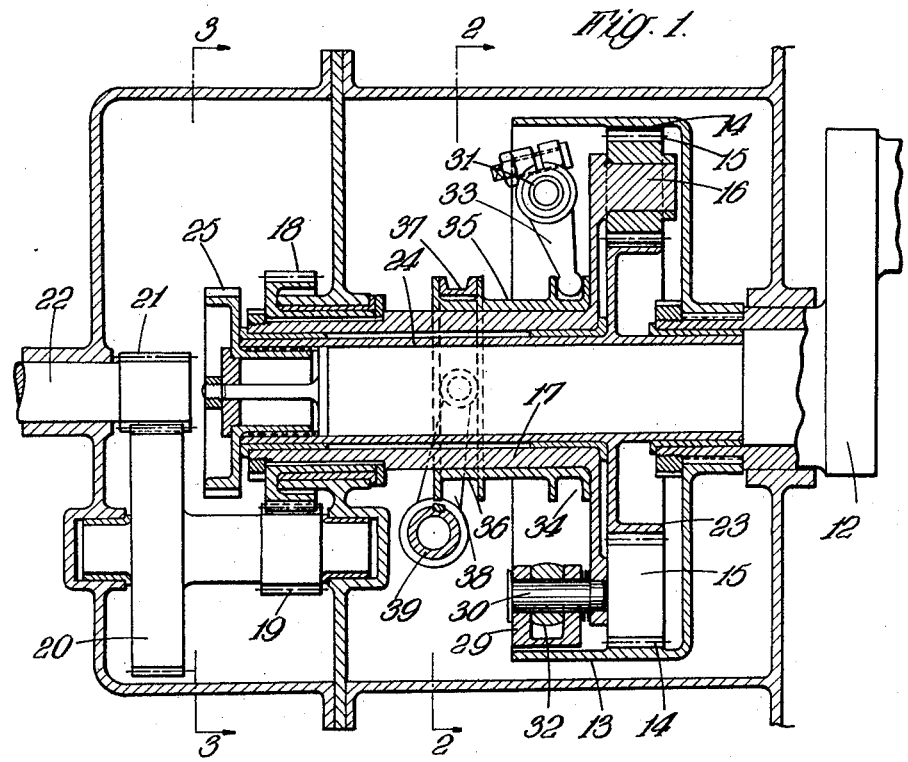
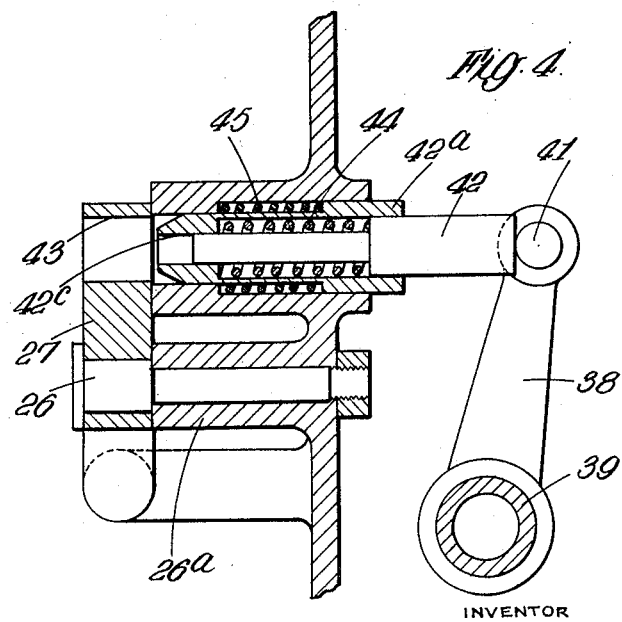
INVENTOR
Archibald Graham Forsyth
BY
Conway J. Cox
ATTORNEY Oct. 31, 1933.  A. G. FORSYTH  1,933,424
TWO-SPEED GEAR FOR INTERNAL COMBUSTION ENGINE SUPERCHARGERS
Filed April 13, 1933   2 Sheets-Sheet 2

INVENTOR
Archibald Graham Forsyth
BY
ATTORNEY

Patented Oct. 31, 1933

1,933,424

UNITED STATES PATENT OFFICE 1,933,424

TWO-SPEED GEAR FOR INTERNAL COMBUSTION ENGINE SUPERCHARGERS

Archibald Graham Forsyth, Cheam, England, assignor to The Fairey Aviation Company Limited, Hayes, England Application April 13, 1933, Serial No. 666,058, and in Great Britain June 8, 1932

5 Claims. (Cl. 74—34)

This invention relates to a two-speed gear for driving a supercharger for the internal combustion engine for an aircraft and consists in the provision in a set of epicyclic gearing of a ratchet and pawl device for preventing rotation of the sun wheel in the reverse direction when the drive is through low gear and of means for withdrawing the pawl when the drive is through high gear.

The epicyclic gearing and a clutch are interposed between the crankshaft of the engine and the rotor shaft of the supercharger which are in alignment, and the sun and ratchet wheels, which are rotatable as one, are coaxial therewith.

The pawl for co-operating with the ratchet wheel is spring influenced and when the gear is changed from low to high, a tapered plunger, actuated by the gear changing mechanism and disposed eccentrically of an aperture in said pawl, is caused to enter said aperture to exert a cam action on the pawl to withdraw it from the ratchet wheel. In order to prevent damage to the parts by positive action the plunger is formed in two relatively slidable parts with an interposed spring, whilst, in order to withdraw the plunger when the gear is changed from high to low, a second spring is arranged to act on the tapered or operative part of said plunger.

Figure 2:
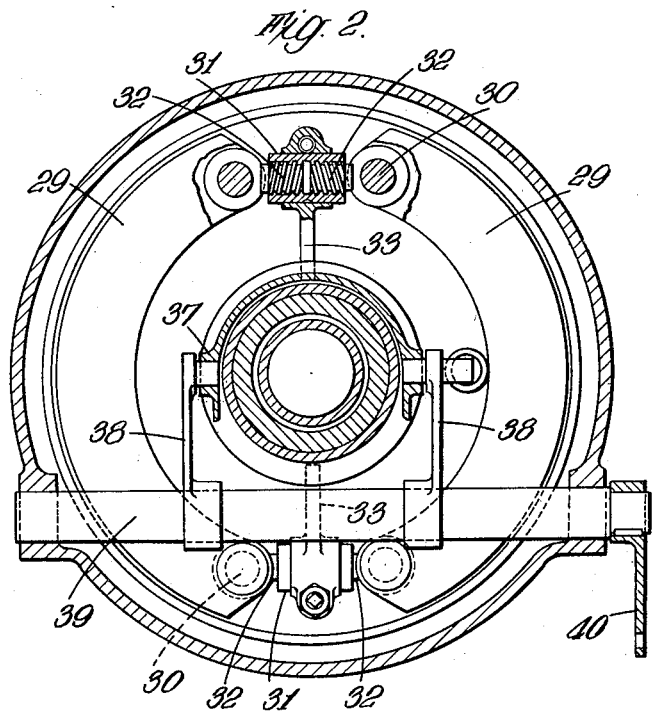
Figure 3:
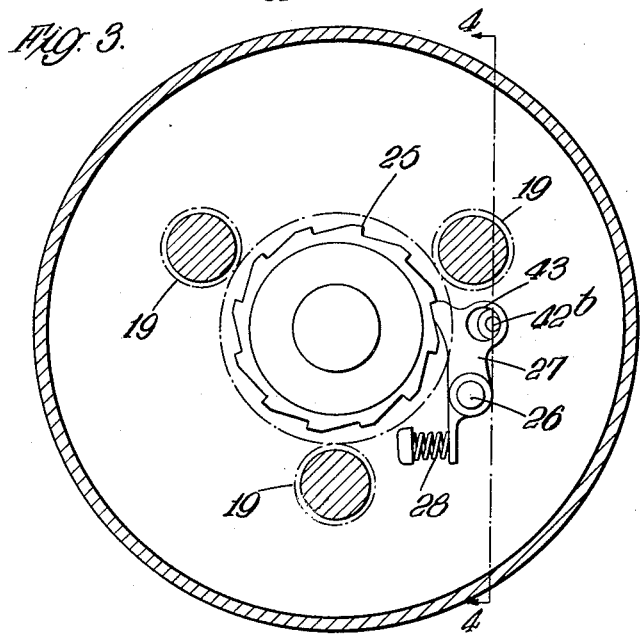

One form of the two speed gear constructed in accordance with this invention is shown in the accompanying drawings of which Figure 1 is a central sectional elevation; Figures 2 and 3 are cross-sectional elevations on the lines 2—2 and 3—3, Figure 1, respectively and Figure 4 is a sectional elevation of a detail on the line 4—4, Figure 3.

As illustrated the crankshaft 12 of the engine (not shown) is positively connected with a combined driving wheel and clutch ring 13 formed internally with teeth 14 with which mesh planetary pinions 15 ... carried by a spider 16 integral with a sleeve 17 on which is a gear wheel 18 meshing with one gear 19 of a train of gears 19, 20, 21 to drive the rotor shaft 22 of the supercharger (not shown). The sun wheel 23 of the gear is coaxial with the engine shaft 12 and is carried by a shaft 24 which passes through the sleeve 17 of the spider 16 and which has a ratchet wheel 25 mounted at its end. Pivoted at 26 (Figures 3 and 4) on a fixed part 26a is a pawl 27 influenced by a spring 28 to co-operate with the ratchet wheel 25 to prevent it, and therefore the sun wheel 23, from rotating in the reverse direction when, for low gear, the drive takes place through the spider 16 carrying the planetary pinions 15... and through the gearwheel 18 on the sleeve 17 of the spider 16.

Within the combined driving wheel and clutch ring 13 are disposed a pair of clutch shoes 29, 29, (Figure 2), pivoted at diametrically opposite pintles 30, 30 on the spider 16 and adapted to be expanded into operative contact with the clutch ring 13 by means of the action of right and left hand threaded nuts 31, 31 on eyebolts 32 ... pivotally mounted in pairs between adjacent ends of the clutch shoes 29, 29, said nuts 31, 31, being turned by levers 33, 33, secured thereto, which engage a groove 34 (Figure 1) in an axially slidable sleeve 35 in another groove 36 in which engages a yoke 37 movable by levers 38, 38, on a cross shaft 39 movable externally by a lever 40. When the clutch shoes 29, 29 are brought into action the spider 16 is locked to the combined driving wheel and clutch ring 13 and as a result those parts, the sun wheel 23, the gear wheel 18 on the sleeve 17 of the spider 16 and the ratchet wheel 25, rotate as one in the same direction. In order that the pawl 27 may be disengaged from the ratchet wheel 25 during the high gear drive one of the levers 38 on the externally movable cross shaft 39 is furnished with a laterally extending pin 41 to engage a plunger 42 which is disposed eccentrically of an aperture 43 in the pawl 27 when the latter is in position to co-operate with the ratchet wheel 25. This plunger 42 is formed in two parts 42, 42a, one, 42, of which is engaged by the pin 41, and is slidable in the other 42a whilst said other part 42a is slidable in a guide in the fixed part 26a to which the pawl is pivoted. The part 42 of the plunger is reduced in diameter at its forward end to constitute a guide pin 42b slidable in an aperture 42c at the forward end of the part 42a and a coiled spring 44 abuts at one end against the shoulder so formed and at the other end against a shoulder in the part 42a of the plunger and said part 42a is tapered externally at its forward end so that when the plunger as a whole is advanced during the change from low to high gear the part 42a is pressed forward into the relatively eccentric aperture 43 and the tapered nose so presented exerts a cam action on the pawl 27 until said aperture and plunger are coaxial and the pawl 27 is withdrawn from the ratchet wheel 25. A second spring 45 is interposed between shoulders on the part 42a of the plunger and on the guide in the fixed part 26a to withdraw the plunger when the gear is changed from high to low and thus allow the pawl 27 to return into engagement with the ratchet wheel 25 to prevent the latter, and hence the sun wheel 15, from reverse rotation.

I claim:—

1. A two-speed gear arrangement for driving a supercharger for an internal combustion engine in which the engine crank-shaft and the rotor shaft of the supercharger are in alignment, comprising, an epicyclic gear having a combined driving wheel and clutch ring, a friction clutch disposed coaxially within said combined driving wheel and clutch ring and including clutch shoes, means for engaging said clutch shoes with said clutch ring, a sun wheel in said epicyclic gear, a ratchet wheel rotatable as one with said sun wheel and mounted coaxially with respect to said shafts, a pawl for engaging said ratchet wheel to prevent rotation of said sun wheel in the reverse direction when the drive is through the epicyclic gear, and means for withdrawing said pawl when the clutch shoes engage with said clutch ring and the drive is through said clutch shoes and clutch ring.

2. In a two-speed gear for driving a supercharger for an internal combustion engine comprising a set of epicyclic gearing including a sun wheel, a ratchet and pawl device for controlling said sun wheel, mechanism for controlling the operation of said epicyclic gearing, means for actuating the pawl of said device to withdraw it from the ratchet, said means consisting of a tapered plunger disposed eccentrically of an aperture in said pawl, and means for connecting said plunger with the mechanism for controlling the operation of said epicyclic gearing whereby said plunger may be moved in said aperture so as to exert a cam action on said pawl.

3. In a two-speed gear for driving a supercharger for an internal combustion engine comprising a set of epicyclic gearing including a sun wheel, a ratchet and pawl device for controlling said sun wheel, mechanism for controlling the operation of said epicyclic gearing, means for actuating the pawl of said device to withdraw it from the ratchet, said means consisting of a plunger disposed eccentrically of an aperture in said pawl, said plunger having two relatively slidable parts one of which is tapered externally, a spring interposed between said parts, a second spring actuating against said tapered part for withdrawing the same, and means for connecting said plunger with the mechanism for controlling the operation of said epicyclic gearing whereby said plunger may be moved in said aperture so as to exert a cam action on said pawl.

4. A two-speed gear arrangement for driving a supercharger for an internal combustion engine in which the engine crank shaft and the rotor shaft of the supercharger are in alignment, comprising, an epicyclic gear having a combined driving wheel and clutch ring, movable shoe-like clutch members disposed within said clutch ring, means for engaging the shoe-like clutch members with said clutch ring, a sun wheel in said epicyclic gear, a ratchet wheel rotatable as one with said sun wheel and mounted coaxially with respect to said shafts, a pawl for engaging said ratchet wheel to prevent rotation of said sun wheel in the reverse direction when the drive is through the epicyclic gear, means for withdrawing said pawl when the clutch members engage with said clutch ring and the drive is through said clutch members and clutch ring, said means for engaging said clutch shoe-like members with said clutch ring comprising an eyebolt connected with each end of each shoe-like member, opposite-handed screw threads on each adjacent pair of eyebolts, and a correspondingly threaded nut cooperating with each of said pairs of eyebolts.

5. A two-speed gear arrangement for driving a supercharger for an internal combustion engine in which the engine crank shaft and the rotor shaft of the supercharger are in alignment, comprising, an epicyclic gear having a combined driving wheel and clutch ring, movable shoe-like clutch members disposed within said clutch ring, means for engaging the shoe-like clutch members with said clutch ring, a sun wheel in said epicyclic gear, a ratchet wheel rotatable as one with said sun wheel and mounted coaxially with respect to said shafts, a pawl for engaging said ratchet wheel to prevent rotation of said sun wheel in the reverse direction when the drive is through the epicyclic gear, means for withdrawing said pawl when the clutch members engage with said clutch ring and the drive is through said clutch members and clutch ring, said means for engaging said shoe-like clutch members with said clutch ring comprising an eyebolt connected with each end of each shoe-like clutch member, opposite handed screw threads on each adjacent pair of eyebolts, a correspondingly threaded nut cooperating with each of said pairs of eyebolts, a sleeve formed with a circumferential groove, means operable externally of said gear for sliding said sleeve axially, and a lever on each of said nuts, the free end of said lever being engaged in said groove.

ARCHIBALD GRAHAM FORSYTH.